United States Patent [19]

Aguado

[11] Patent Number: 5,438,337
[45] Date of Patent: Aug. 1, 1995

[54] NAVIGATION SYSTEM USING RE-TRANSMITTED GPS

[75] Inventor: Morton M. Aguado, New York, N.Y.

[73] Assignee: Northrop Grumman Corporation, Los Angeles, Calif.

[21] Appl. No.: 127,039

[22] Filed: Sep. 24, 1993

[51] Int. Cl.⁶ .......................... G81S 5/02; H04B 7/185
[52] U.S. Cl. .................... 342/357; 342/453; 342/353
[58] Field of Search .............. 342/357, 453, 424, 442, 342/353; 364/458

[56] References Cited

U.S. PATENT DOCUMENTS

| | | | |
|---|---|---|---|
| 4,918,609 | 4/1990 | Yamawaki | 364/449 |
| 5,099,245 | 3/1992 | Sagey | 342/357 |
| 5,119,102 | 6/1992 | Barnard | 342/357 |
| 5,202,829 | 4/1993 | Geier | 364/449 |
| 5,252,982 | 10/1993 | Frei | 342/357 |
| 5,261,118 | 11/1993 | Vanderspool, II et al. | 455/51.2 |
| 5,361,212 | 11/1994 | Class et al. | 364/428 |

*Primary Examiner*—Theodore M. Blum
*Assistant Examiner*—Dao L. Phan
*Attorney, Agent, or Firm*—Terry J. Anderson; Karl J. Hoch, Jr.

[57] ABSTRACT

A system for measuring the relative positions of first and second units includes a re-transmitting apparatus at the first unit and a receiver at the second unit capable of making simultaneous real-time comparisons of phase and frequency information contained in first signals received directly from the satellites by the second unit and second signals received from the satellites by the first unit and immediately retransmitted to the second unit in their entirety without processing before retransmission.

45 Claims, 2 Drawing Sheets

NAVIGATION SYSTEM USING RE-TRANSMITTED GPS

BACKGROUND OF THE INVENTION

1. Field of the Invention

This invention generally relates to a navigation system which uses satellites to compute position and velocity data for guiding or tracking a variety of airborne, marine, and land-based systems.

2. Description of Related Art

The accuracy of position-determining systems for airborne, marine, and land-based systems has been greatly increased with the advent of satellite technology, and in particular the Navigation Satellite Timing and Ranging Global Positioning System (NAVSTAR GPS). In this system, a total of 24 satellites are deployed, with four satellites in each of six orbit planes, so that at least four satellites come within the same field of view twenty-four hours a day all over the world.

The general approach to utilizing GPS for navigation purposes, known as absolute GPS, is simply to calculate the range to the satellites in view by measuring the transmission and receiving time in comparison with a clock synchronized to the satellite clock given the position of the satellite at the transmitting time. The accuracy of this approach is approximately 15 meters spherical error probable (SEP). In many applications, such as position and velocity determination for the purpose of assisting precision approaches during landing of aircraft, an accuracy of 15 meters is insufficient.

In an attempt to improve the accuracy of GPS in general, a technique known as differential GPS has been proposed to eliminate those errors which are common to both a user and the reference receivers. Differential GPS uses a GPS receiver at a fixed surveyed site to compute fixed bias corrections for the GPS satellite range measurements based on the difference between the position calculated using the reference receiver's GPS measurements and that defined by the site survey. These bias correction measurements are then communicated via a data link to a vehicle whose position and/or velocity is to be determined.

While for many applications differential GPS navigation represents an improvement over absolute GPS, it too has a number of drawbacks. The need for a fixed survey site and a communication link between the site and the subject vehicle, as well as the latency and degradation of the corrections with time, all limit the ability of differential GPS to provide the very accurate position data required for precision applications such as approach and landing navigation requirements at airports.

A variation of the differential GPS technique, in which the GPS signal received at the subject vehicle is retransmitted to the base site for comparison, has been proposed in U.S. Pat. No. 5,119,102. While similar to the present invention in its use of retransmission, the designers of this system have apparently failed to appreciate the possibility of real-time comparison of simultaneously received direct and retransmitted GPS signals.

The core of their approach, receipt of the GPS signals, time tagging with "Time of Arrival," recording of the GPS data, and subsequent transmission of the data at a slower rate via a radio channel, are all unnecessary and wasteful. In contrast, this invention dispenses with all these elements and provides a completely different approach to re-transmission which will provide for substantially greater efficiency and error reduction.

The need for accurate navigation data is especially acute in the case of automatic carrier landings, where the runway is exceedingly short and narrow and extremely unforgiving. The slightest miscalculation in the navigation of the aircraft relative to the carrier runway could result in disaster. Present systems, including absolute and differential GPS, and the system disclosed in U.S. Pat. No. 5,119,102, are incapable of meeting the accuracy requirements for such carrier landings.

SUMMARY OF THE INVENTION

It is a first objective of the invention to provide a satellite-based navigation system, and in particular a GPS navigation system, which does not have the errors associated with data generated by conventional absolute and differential GPS navigation systems, resulting in the generation of position and velocity measurements having increased accuracy.

It is a second objective of the invention to provide a satellite-based navigation system, and in particular a GPS navigation system, in which all necessary calculations are made at one user station using a single receiver, as opposed to conventional absolute and differential GPS systems which take range measurements to at least two user stations using two different receivers, thereby eliminating receiver error attributable to the use of two receivers and clock errors attributable to the use of multiple GPS receiver clocks.

It is a third objective of the present invention to provide a satellite-based navigation system which is less expensive to implement because it requires less hardware than certain conventional satellite-based systems—only one receiver as opposed to two, and because there is no need for additional data or communications links between the receiver and a surveyed site.

It is a fourth objective of the present invention to provide a navigation system which uses satellites to compute position information which can fulfill the navigation accuracy requirements for precision approach and landing of aircraft at airports or for automatic carrier landing.

These objectives are achieved by recasting the navigation problem as a relative one where the GPS position and velocity of one unit (e.g., an aircraft or landing point) is computed relative to the other unit (landing point or aircraft), and by maximizing the commonality of equipment, satellites, and propagation path (for units in the same proximity) into a single receiver on a measurement-to-measurement basis, thus utilizing the full relative navigation potential for error reduction and eliminating the need to compute and communicate data between the two units beyond the re-transmitted GPS signal.

The basic idea in this re-transmitted GPS approach is to re-transmit the GPS data received from a set of satellites at the antenna of one unit directly, as received, to the second unit where the first and second units' relative position and/or velocity are computed using data derived from the same set of satellites. The re-transmitting unit therefore acts only as a GPS signal pass-through and no measurements need be made the first unit.

In a preferred embodiment of the invention, the re-transmitted data is processed by the second unit's GPS receiver/computer, which effects a pseudo-range and a pseudo-range rate measurement, from which it computes the first unit's position and velocity based on the re-transmitted GPS data, and its own position and velocity based on GPS data it receives directly. Since unit 2 makes all the measurements simultaneously, it can choose measurements to the same satellites to make the computation. Effectively, the relative position and velocity computation will be based on simultaneous measurements, taken to the same satellites via two paths and processed in a common receiver. Thus, errors common to both units cancel, resulting in substantial error reduction on a sample-to-sample basis.

Because the GPS landing data has been recast in relative terms of one unit relative to another unit, the absolute position of either unit is of no consequence, and the need for a surveyed site is precluded unless a particular application requires it.

DETAILED DESCRIPTION OF THE PREFERRED EMBODIMENTS

Figure 1:
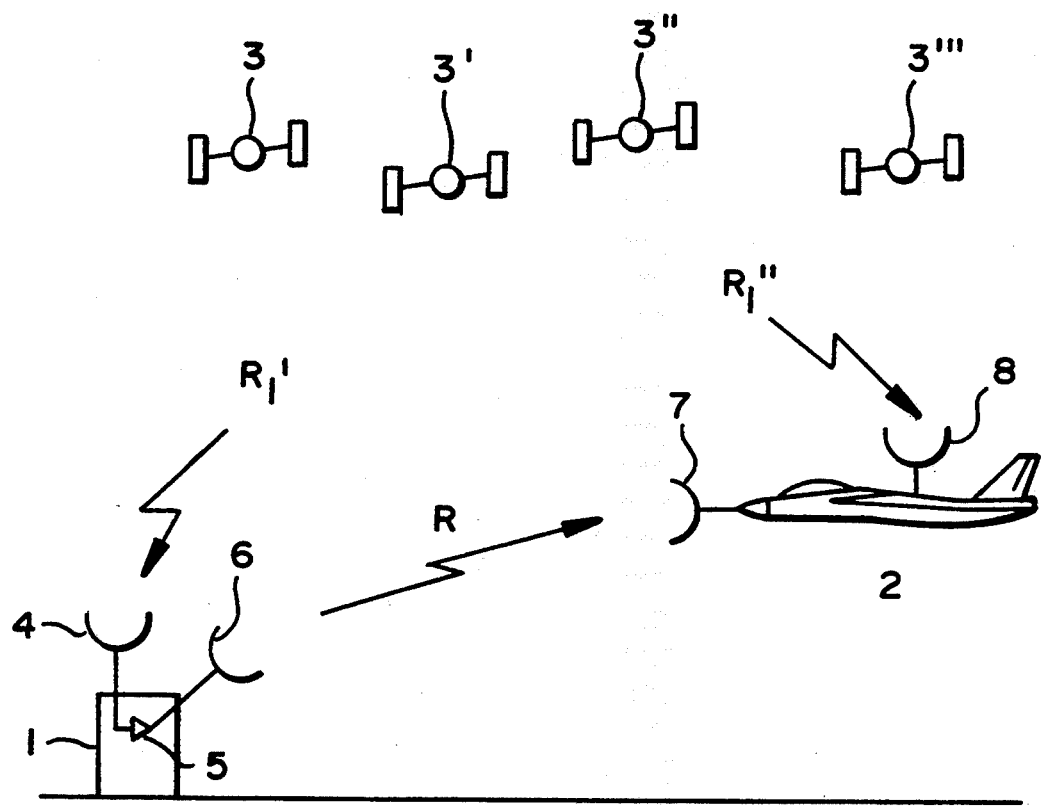
FIG. 1 is a schematic diagram showing a first preferred embodiment of the navigation system of the present invention wherein GPS signals are retransmitted from an airport to an aircraft to allow the aircraft to compute its position and velocity relative to the airport.

FIG. 1 is a schematic diagram of a satellite navigation system arranged to determine the position of a first unit 1 relative to a second unit 2, in which the first unit is carried by an aircraft and the second unit is located at an airport, the relative positioning information being used to assist the aircraft in making a precision landing at the airport. It will of course be appreciated by those skilled in the art that the system may be used in a variety of contexts where precision navigation is required, including land and marine vehicles, as well as both manned and unmanned airborne vehicles.

As shown in FIG. 1, the navigation system includes a re-transmitting unit 1, a receiving unit 2, and four satellites 3, 3', 3", and 3'" in the field of view of the first and second units. Additional satellites may also be in view. Satellites 3 are NAVSTAR GPS satellites deployed at spaced intervals in predefined geostationary orbits, although it is possible that other satellite systems may be deployed in the future to which the principles of the invention could also be applied. Once such system could be the Soviet Satellite Navigation System GLONASS which is presently being deployed.

Each satellite 3'-3'" transmits a GPS range-finding signal to all points within its field of view. By measuring the propagation time of these signals, a user within this field of view can determine the distance or range to the respective satellites. Theoretically, only three satellites are required to calculate a three-dimensional position, but the use of four satellites enables a fourth variable, the GPS time correction factor TB, to be utilized to compensate for used satellite clock synchronization. If only two-dimensional positions such as latitude and longitude are required, three satellites are sufficient. A number of satellites greater than four would provide further accuracy.

In the embodiment of FIG. 1, re-transmitting unit 1 operates solely as a signal pass-through, sending the GPS signals it detects from satellites 3 to receiving unit 2 in their entirety for simultaneous processing with GPS signals received by the receiving unit 2 directly from the respective satellites. Re-transmitting unit 1 neither processes the GPS signals in any way nor performs range measurements of any type. As a result, the hardware required for unit 1 is very simple a receiving antenna 4 for detecting the GPS signals transmitted from satellites 3-3'", an amplifier circuit 5 for amplifying the GPS signals, and a transmitter 6 for re-transmitting the amplified GPS signals to receiving unit 2. Those skilled in the art will appreciate that an absolute range measurement could be made at unit 1 by attaching a signal splitter (not shown) at antenna 4 to redirect a portion of the detected GPS signals into a GPS receiver/computer (not shown), which in turn would compute the absolute position of unit 1 in GPS coordinates, but such an addition to the retransmitting arrangement would have no effect on the determination of unit 1's position relative to unit, by unit 2.

Unit 1 could also utilize the data block in the GPS signal which is reserved for special messages by inserting information such as an identification code into the GPS signal during amplification.

Receiving unit 2 includes two multi-channel GPS receivers connected to antennas 7 and 8 for receiving respectively the GPS signals re-transmitted from unit 1 (hereinafter called the "re-transmitted GPS signals") and the GPS signals transmitted to unit 2 directly from satellites 3 (hereinafter called the "direct GPS signals"). Each GPS receiver preferably includes at least four channels for respectively receiving a GPS signal from each of the four satellites 3-3'". Means, however, must be provided for synchronizing the clocks of the two receivers so that the time bias is the same for the measurements in both receivers. This synchronization can be done in hardware or in software by computing the TB or both receivers. The two GPS receivers, however, may be replaced by a single GPS receiver having at least eight channels, four of which would be dedicated to receiving the direct GPS signals and four of which would be dedicated to receiving the re-transmitted GPS signals, and since all the channels use the same clock, would not require the TB synchronization alluded to above.

Figure 2:
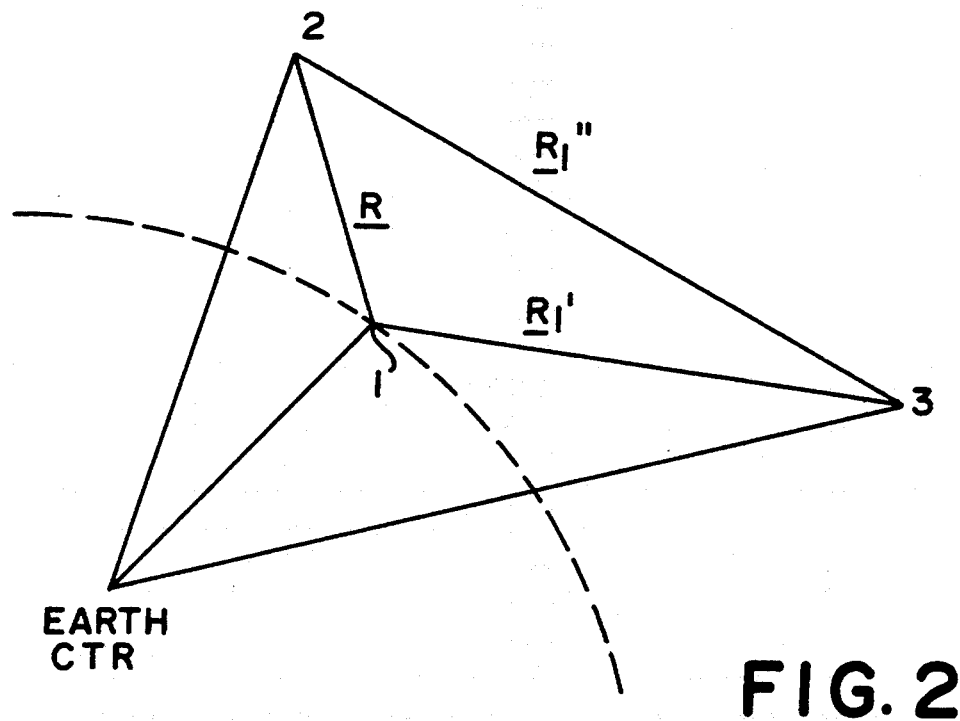
FIG. 2 is a schematic diagram showing pseudoranges computed by the navigation system of the present invention.

Receiving unit 2 includes a signal processing unit which processes the re-transmittal and direct signals received by respective antennas 7 and 8 to derive the position of receiving unit 2 relative to re-transmitting unit 1 in three dimensional coordinates, as illustrated in FIG. 2. This process essentially involves deriving a set of double difference pseudo-range measurements based on the direct and re-transmitted GPS signals, and since all the channels would use the same clock, would not require the TB synchronization alluded to above.

The range $R_i^d$ between each of the four satellites and receiving unit 2 along signal paths which extend directly between each of the satellites and unit 2 is given by the following relationship:

$$R_i^d = R_i'' + TB \tag{1}$$

where i=1 to 4 for four satellites, $R_i''$ is the pseudo ranges from the respective satellites to unit 2, and TB is the GPS time bias represented in units of range, which is the same fixed constant for each satellite. A pseudo-range measurement is one representing the range between the point of transmission and the point of reception without regard to the distance error, represented by the time bias constant. In the equations above, $R_i''$ is the pseudo range, while $R_i'' + TB$, for example, is the true range, i.e., the distance between the point of transmission and the point of reception with the distance error factored in.

Similarly, the range $R_i^r$ between each of the four satellites and receiving unit 2 through a signal path which passes through re-transmitting unit 1 is represented by the relationship:

$$R_i^r = R_i' + TB + R \tag{2}$$

where i=1 to 4 in the case of four satellites, $R_i'$ is the pseudo-range between each of the satellites and unit 2, TB is again the GPS time bias for each of the satellites, and R is the range between re-transmitting unit 1 and receiving unit 2.

This set of range equations is first combined by subtracting respective equations in the set of true range equations corresponding to the re-transmitted signal path from equations in the set of true range equations corresponding to the direct signal path, as follows:

$$\Delta R_i = R_i^d - R_i^r = R_i'' - R_i' - R \tag{3}$$

Difference equation (3) eliminates the time bias term as an unknown in the equations and is made possible by the use of the same four satellites for both units and the fact that the same clock, that of receiver 2, can be used for both pseudo-range calculations. Since the position of receiving unit 2 relative to re-transmitting unit 1 can be derived from the pseudo-range calculations $R_i'' - R_i'$, only one unknown R is left in the equation, and all bias-like errors such as satellite clock ephemeris, propagation, receiver, and others common to units 1 and 2 are eliminated on a sample-to-sample basis. At this point, only the re-transmission errors associated with R, the range between unit 1 and unit 2.

To eliminate the range and the re-transmission errors, including re-transmission multipath errors, the resulting set of difference equations is then combined to obtain a set of double difference range equations, derived by taking the difference between pairs of first difference range equations. The double difference taken produces three equations given by:

$$\delta \Delta R_{12} = (R_2'' - R_2') - (R_1'' - R_1') \tag{4}$$

$$\delta \Delta R_{13} = (R_3'' - R_3') - (R_1'' - R_1') \tag{5}$$

$$\delta \Delta R_{14} = (R_4'' - R_4') - (R_1'' - R_1') \tag{6}$$

The quantities $\delta \Delta R_{12}$, $\delta \Delta R_{13}$, and $\delta \Delta R_{14}$ represent the double difference pseudo-range measurements from which the three-dimensional position of unit 2 relative to unit 1 can be determined.

In practice, the GPS signals received from satellites 3 by receiving unit 2 could be converted into pseudo-range measurements $R_i'$ and $R_i''$ in the conventional manner by multiplying the speed of light by the difference between the transmission time and the arrival time of the GPS signals, the time difference being obtained by measuring the phase shift necessary to line up the satellite generated code in a respective GPS signal with a corresponding receiver generated code. However, even further error reduction can be obtained with the double difference technique by lining up the satellite-generated re-transmitted signal code with the satellite generated directly received signal code in a receiver designed for this type of measurement.

Those skilled in the art will appreciate that relative velocity data free from bias and multipath errors also can be calculated, in an analogous manner, by formulating a set of double difference range rate measurements from the following true range rate calculations obtained from doppler shift measurements of the direct and re-transmitted GPS signals relative satellite transmitted carrier frequency:

$$R_i^d = R_i'' + TB$$

$$R_i^r = R_i' + TB + R$$

Figure 4:
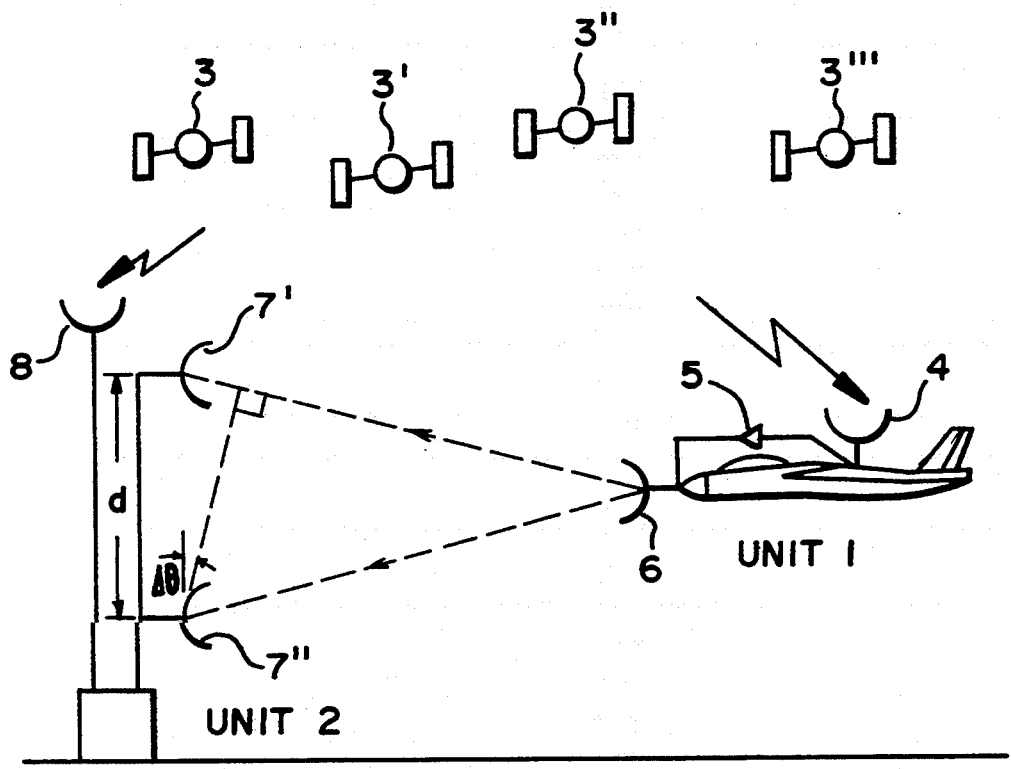
FIG. 4 is a schematic diagram showing a third preferred embodiment of the navigation system of the present invention wherein GPS signals are compared and more accurate vertical data is derived using an interferometer.

As shown in FIG. 4, to provide greater accuracy in altitude determination or in the Z-direction, a vertical interferometer which measures a carrier phase difference between the retransmitted signals detected by antennas 7' and 7'' may be included at receiving unit 2. While the inclusion of a vertical interferometer will introduce ambiguities into the system, these ambiguities may be resolved by the usual method of adding a third element.

Those skilled in the art will appreciate that the GPS signal carrier phase can be measured extremely accurately, to substantially greater precision than the standard code based measurement. By utilizing a GPS receiver that can track the continuous GPS carrier phase, a cumulative measure of the phase to each satellite can be provided in addition to the standard, code based, pseudo-range measurement.

This phase measurement is ambiguous, however, by an initial integer bias. This invention provides a means for estimating the initial integer bias, in real time, based on the essentially bias error free double difference pseudo-range given previously.

The relationship between the double difference accumulated carrier phase measurements and the code-based pseudo-range measurements is given by the following three relationships:

$$\nabla \phi_{12} = [(R_2'' - R_2') - (R_1'' - R_1')]/2 - N_{12}$$

$$\nabla \phi_{13} = [(R_3'' - R_3') - (R_1'' - R_1')]/2 - N_{13}$$

$$\nabla \phi_{14} = [(R_4'' - R_4') - (R_1'' - R_1')]/2 - N_{14}$$

where $\nabla \phi_{mn}$ = double difference accumulated carrier phase for satellites m & n, $\lambda$ = GPS carrier wavelength, $N_{mm}$ is the initial integer phase ambiguity for satellites m and n, and the R's are the pseudo-range defined previously.

Given the phase and pseudo-range double difference (divided by $\lambda$), simple averaging of the difference will allow for the estimate of the three double difference phase ambiguities, after which the very accurate double difference phase measurements in combination with the bias-free pseudo-range double differences will allow for even greater precision in the calculation of the relative position and velocity using this invention.

In order to prevent overlap between the re-transmitted GPS signals and the direct GPS signals received by unit 2, which could result in a corruption of the position data, the GPS signals being re-transmitted at unit 1 may be shifted to an L-band carrier different from the carrier used in the transmission of the direct GPS signals. This can be accomplished by integrating low cost heterodyne electronics into the re-transmission amplifier of unit 1, which will shift the carrier frequency of the GPS signals on re-transmission to an L-band frequency different from the that used by the satellites. At unit 2, where the re-transmitted GPS signals are received, low cost heterodyne electronics could again be used to shift the re-transmitted GPS signals back to the original GPS L-band frequency for reception by the GPS receiver at unit 2. Any errors introduced by the heterodyne will similarly effect all four re-transmitted satellite signals and will cancel out in the double difference computation.

Another method of preventing overlap, which is the method GPS itself uses, could be to shift the satellite signals being retransmitted to a different set of unused GPS codes, which could be used exclusively for re-transmitted GPS signals and would thereby identify the re-transmitted signals as such.

Figure 3:
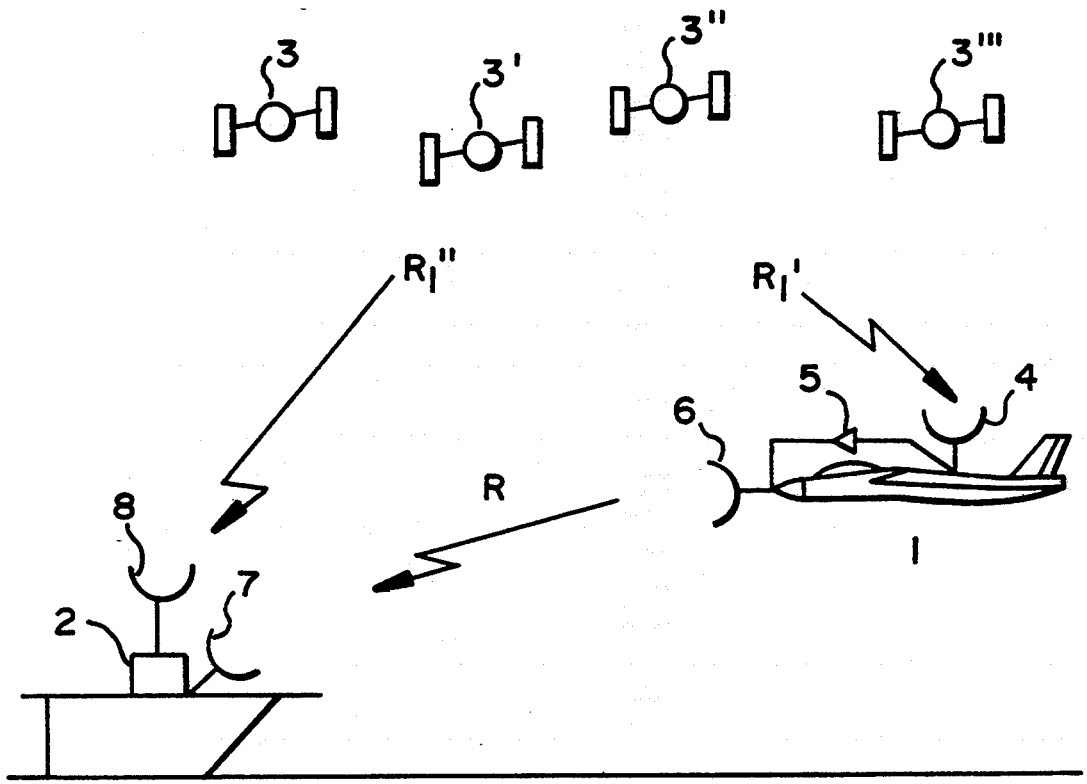
FIG. 3 is a schematic diagram showing a second preferred embodiment of the navigation system of the present invention wherein GPS signals are retransmitted from an aircraft to a carrier ship to allow the carrier ship to compute the aircraft's position and velocity relative to the ship.

FIG. 3 illustrates a variation of the preferred embodiment of the present invention in which the re-transmitting unit is positioned on an aircraft and the receiving unit is an aircraft carrier supplied with information concerning the position of the incoming aircraft during an automatic carrier landing. In this context, the carrier receiving unit computes the GPS position and velocity of the incoming aircraft relative to the flight deck of the carrier in the same manner as described above using the double difference technique to replace the conventional carrier-based tracking radar.

In addition to the above-illustrated applications, the navigation system of the present invention may also be used in a variety of other contexts, such as for navigation during roll-out after touchdown, aircraft to aircraft position location (an entire relative navigational net can be established using retransmitted GPS) and for ground location of taxiing aircraft (in which case, retransmission from the aircraft to the tower will allow the tower to precisely locate each taxiing aircraft), and for providing a base station with position and velocity data concerning enroute, as opposed to landing, aircraft.

When the preferred system is used for providing a base station with position and velocity information concerning enroute aircraft travelling at substantial distances from the base station, it may not be possible to derive the GPS data supplied directly to the base and the GPS data retransmitted from the enroute aircraft from the same satellites, in which case it would be advantageous for the base to select a set of satellites from the aircraft's retransmitted GPS data which gives the same GDOP as the set of satellites used to provide the base with its own position information from its direct reception of GPS data. Other criterion could be used.

The navigation system of the present invention may also be used to fulfill the navigation requirements for a missile command guidance system. GPS retransmission on the missile allows a controlling mother aircraft to compute the missile position relative to the mother aircraft. The mother aircraft then formulates missile guidance commands to a target, the commands being previously defined in GPS coordinates or by the mother aircraft's targeting sensor.

When applied to the fields of geodesy and surveying, the receiving unit (unit 2) may be located at a fixed surveyed site and the location of the re-transmitting unit (unit 1) is located at the site to be surveyed. The location of the site to be surveyed can then be computed relative to the surveyed coordinates.

In search and rescue applications, the re-transmitting unit would be carried by the persons to be rescued and the re-transmitting unit would be carried by a search team. The re-transmitting unit may consist of a handheld unit having two GPS receive/transmit antennas, an amplifier connecting the two antennas, and a small battery. The search unit would consist of the standard GPS configuration of a full GPS unit with a common, multi-channel receiver for receiving both the direct and re-transmitted GPS signals, and an extra antenna to receive the re-transmitted GPS signal.

In yet another context, the retransmitted GPS navigation system of the present invention may be used for both land and marine navigation, for example as the position locating system in the proposed Department of Transportation Intelligent Vehicle Highway System.

Finally, it is anticipated that numerous other applications of the invention will occur to those skilled in the art, and that numerous modifications and variations of the above-described and illustrated embodiments will be developed as the GPS system becomes fully deployed and available to the public. Consequently, it is intended that the invention not be construed as being limited to the embodiments described and illustrated herein, but rather that it be defined solely by the appended claims.

I claim:

1. In a system for determining positions of a first unit relative to a second unit of the type which includes means for receiving signals from a plurality of satellites deployed at spaced intervals within one or more geostationary orbits, said satellites transmitting GPS signals to first and second units whose relative positions are to be determined, the improvement comprising means at the first unit for retransmitting the signals in their entirety, without delay, from said satellites to the second unit; means at the second unit for receiving signals directly from said satellites and for simultaneously receiving the signals retransmitted from the first unit; signal processing means connected to said receiving means for performing a sample-by-sample comparison of the directly received and retransmitted signals in order to extract information, without input of additional position data, concerning the relative positions of the first and second units.

2. A system as claimed in claim 1, wherein said signal processing means comprises means for computing a first set of range measurements based on said retransmitted signals, means for computing a second set of range measurements based on the GPS signals received from said satellites, and means for subtracting said respective range measurements in said first and second sets to obtain a difference measurement free of bias errors.

3. A system as claimed in claim 2, wherein said signal processing means further comprises means for calculating a set of double difference range measurements based on said first and said second sets of range measurements, and deriving the position of said first unit relative to said second unit based on said double difference range measurements.

4. A system as claimed in claim 3, wherein the double difference range equations are derived from the following equations:

$$\delta \Delta R_{12} = (R_2'' - R_2') - (R_1'' - R_1')$$

$$\delta \Delta R_{13} = (R_3'' - R_3') - (R_1'' - R_1')$$

$$\delta \Delta R_{14} = (R_4'' - R_4') - (R_1'' - R_1')$$

where $R'_i$ and $R''_i$ ($i=1$ to 4) are respective first and second pseudo-range measurements.

5. A system as claimed in claim 2, wherein said signal processing means further comprises means for calculating a set of double difference range measurements based on said first and said second sets of range measurements; means for computing a set of GPS carrier phase measurements representing cumulative measurements of the carrier phase to each of said satellites; and means for calculating a set of double difference accumulated carrier phase measurements based on said set of GPS carrier phase measurements, the position of said first relative unit relative to said second unit being derived based on said double difference range measurements and said double difference accumulated carrier phase measurements.

6. A system as claimed in claim 5, wherein the double difference range equations are derived from the following equations:

$$\delta \Delta R_{12} = (R_2'' - R_2') - (R_1'' - R_1')$$

$$\delta \Delta R_{13} = (R_3'' - R_3') - (R_1'' - R_1')$$

$$\delta \Delta R_{14} = (R_4'' - R_4') - (R_1'' - R_1')$$

where $R'$ and $R''$ ($i=1$ to 4) are respective first and second pseudo-range measurements.

7. A system as claimed in claim 6, wherein said set of double difference accumulated carrier phase measurements are related to said set of double difference range measurements by the following equations:

$$\nabla \phi_{12} = [(R_2'' - R_2') - (R_1'' - R_1')]/2 - N_{12}$$

$$\nabla \phi_{13} = [(R_3'' - R_3') - (R_1'' - R_1')]/2 - N_{13}$$

$$\nabla \phi_{14} = [(R_4'' - R_4') - (R_1'' - R_1')]/2 - N_{14}$$

where $\nabla \phi_{12}$, $\nabla \phi_{13}$, $\nabla \phi_{14}$ are the double difference accumulated carrier phases for satellites 1 to 4, and $N_{12}$, $N_{13}$, $N_{14}$ are the initial integer phase ambiguities for satellites 1 to 4.

8. A system as recited in claim 1, wherein said plurality of satellites comprises four satellites.

9. A system as recited in claim 1, wherein said receiving means is a single receiver having a number of channels equal to at least twice the number of said satellites, a first half of said channels being dedicated to receiving the signals from said satellites and a second half of said channels being dedicated to receiving the signals re-transmitted from the first unit.

10. A system as recited in claim 1, wherein said receiving means includes a first receiver for receiving the signals from said satellites and a second receiver for receiving the signals re-transmitted from the first unit.

11. A system as recited in claim 1, wherein said receiving means includes a receiver for receiving the signals from said satellites and an interferometer for receiving and extracting phase information from the signals re-transmitted from the first unit.

12. A system as recited in claim 1, wherein the re-transmitting means at said first unit includes a receiving antenna for receiving signals from said satellites, an amplifier for amplifying the signals from the receiving antenna, and a transmitter for transmitting the signals in their amplified state to the second unit.

13. A navigation system for use in conjunction with a global positioning system, comprising:
a first user station having GPS signal re-transmitting means; and
a second user station having a receiving means for receiving simultaneously a first series of GPS signals from a predetermined number of satellites along a signal path extending directly between said satellites and said second user station and a second series of GPS signals from the same satellites along a signal path which passes through the re-transmitting means at said first user station, and
a computing means for computing a first set of range measurements based on said first series of GPS signals, computing a second set of range measurements based on second series of GPS signals, computing a set of differential range measurements by subtracting respectively said first set of range measurements from said second set of range measurements, computing a set of double difference range measurements by subtracting said differential range measurements from one another, and deriving from said set of double difference range measurements a position of the first user station relative to said second user station.

14. A system as claimed in claim 13, wherein the double difference range measurements for the respective are obtained from the following equations:

$$\delta \Delta R_{12} = (R_2'' - R_2') - (R_1'' - R_1')$$

$$\delta \Delta R_{13} = (R_3'' - R_3') - (R_1'' - R_1')$$

$$\delta \Delta R_{14} = (R_4'' - R_4') - (R_1'' - R_1')$$

where $R'_i$ and $R''_i$ ($i=1$ to 4) are respective first and second pseudo-range measurements.

15. A system as claimed in claim 14, wherein said computing means computes a set of GPS carrier phase measurements representing cumulative measurements of the carrier phase to each of said satellites and then computes a set of double difference accumulated carrier phase measurements based on said set of GPS carrier phase measurements, the relationship between said set of double difference accumulated earlier phase measurements and said set of double difference range measurements being given by the following equations:

$$\nabla \phi_{12} = [(R_2'' - R_2') - (R_1'' - R_1')]/2 - N_{12}$$

$$\nabla \phi_{13} = [(R_3'' - R_3') - (R_1'' - R_1')]/2 - N_{13}$$

$$\nabla \phi_{14} = [(R_4'' - R_4') - (R_1'' - R_1')]/2 - N_{14}$$

where $\nabla \phi_{12}$, $\nabla \phi_{13}$, $\nabla \phi_{14}$ are the double difference accumulated carrier phases for satellites 1 to 4, and $N_{12}$, $N_{13}$, $N_{14}$ are the initial integer phase ambiguities for satellites 1 to 4, the position of the first user station relative to the second user station also being derived from said set of double difference accumulated carrier phase measurements.

16. A navigation system as recited in claim 13, wherein said predetermined number of satellites is four.

17. A navigation system as recited in claim 13, wherein said receiving means is a single GPS receiver having a number of channels equal to at least twice the number of said satellites, a first half of said channels being dedicated to receiving said first series of GPS signals and a second half of said channels being dedicated to receiving said second series of GPS signals.

18. A navigation system as recited in claim 13, wherein said receiving means includes first and second GPS receivers, said first GPS receiver receiving said first series of GPS signals and said second GPS receiver receiving said second series of GPS signals.

19. A navigation system as recited in claim 13, wherein said receiving means includes a GPS receiver for receiving said first series of GPS signals and an interferometer for receiving and combining said second series of GPS signals.

20. A navigation system as recited in claim 13, wherein the re-transmitting means at said first user station includes a receiving antenna for receiving GPS signals from said satellites, an amplifier for amplifying the GPS signals from the receiving antenna, and a transmitter for transmitting the GPS signals in their amplified state to the second user station.

21. In a system for determining velocities of a first unit relative to a second unit of the type which includes means for receiving signals from a plurality of satellites deployed at spaced intervals within one or more geostationary orbits, said satellites transmitting GPS signals to first and second units whose relative velocities are to be determined, the improvement comprising means at the first unit for retransmitting the signals in their entirety, without delay, from said satellites to the second unit; means at the second unit for receiving signals directly from said satellites and for simultaneously receiving the signals retransmitted from the first unit; signal processing means connected to said receiving means for performing a sample-by-sample comparison of the directly received and retransmitted signals in order to extract information, without input of additional position data, concerning the relative velocities of the first and second units.

22. A system as claimed in claim 21, wherein said signal processing means comprises means for computing a first set of velocity measurements based on said retransmitted signals, means for computing a second set of velocity measurements based on the GPS signals received from said satellites, and means for subtracting said respective velocity measurements in said first and second sets to obtain a difference measurement free of bias errors.

23. A system as claimed in claim 21, wherein said signal processing means further comprises means for calculating a set of double difference velocity measurements based on said first and said second sets of velocity measurements, and deriving the velocity of said first unit relative to said second unit based on said double difference velocity measurements.

24. The system as claimed in claim 21, wherein said signal processing means further comprises means for calculating a set of double difference velocity measurements based on said first and said second sets of velocity measurements, means for computing a set of GPS carrier phase measurements representing cumulative measurements of the carrier to each of said satellites; and means for calculating a set of double difference accumulated carrier phase measurements, the position of said first unit relative to said second unit being derived from said double difference velocity measurements and said double difference accumulated carrier phase measurements.

25. In a method of determining positions of a first unit relative to a second unit of the type which includes the step of receiving signals from a plurality of satellites deployed at spaced intervals within one or more geostationary orbits, the improvement comprising the steps of retransmitting the signals in their entirety, without delay, from said satellites to the second unit; receiving at the second unit directly from said satellites and simultaneously receiving the signals retransmitted from the first unit; and performing a real time sample-by-sample comparison of the directly received and retransmitted signals in order to extract information, without input of additional position data, concerning the relative positions of the first and second units.

26. A method as claimed in claim 25, further comprising the steps of computing a first set of range measurements based on said retransmitted signals, means for computing a second set of range measurements based on the GPS signals received from said satellites, and means for subtracting said respective range measurements in said first and second sets to obtain a difference measurement free of bias errors.

27. A method as claimed in claim 26, further comprising the steps of calculating a set of double difference range measurements based on said first and said second sets of range measurements, and deriving the position of said first unit relative to said second unit based on said double difference range measurements.

28. A method as claimed in claim 27, wherein the step of calculating the set of double difference range measurements comprises the step of computing $\delta\Delta R_{nx}$, $\delta\Delta R_{ny}$, and $\delta\Delta R_{nz}$ defined as follows:

$$\delta\Delta R_{12} = (R_2'' - R_2') - (R_1'' - R_1')$$

$$\delta\Delta R_{13} = (R_3'' - R_3') - (R_1'' - R_1')$$

$$\delta\Delta R_{14} = (R_4'' - R_4') - (R_1'' - R_1')$$

where $R'_i$ and $R''_i$ (i=1 to 4) are respective first and second pseudo-range measurements.

29. A method as claimed in claim 26, further comprising the steps of: calculating a set of double difference range measurements based on said first and said second sets of range measurements; computing a set of GPS carrier phase measurements representing cumulative measurements of the carrier phase to each of said satellites, calculating a set of double difference accumulated carrier phase measurements based on said set of GPS carrier phase measurements; and deriving the position of said first unit relative to said second unit based on said double difference range measurements and said double difference accumulated carrier phase measurements.

30. A method as claimed in claim 29, wherein said double difference range equations are given by:

$$\delta\Delta R_{12} = (R_2'' - R_2') - (R_1'' - R_1')$$

$$\delta\Delta R_{13} = (R_3'' - R_3') - (R_1'' - R_1')$$

$$\delta\Delta R_{14} = (R_4'' - R_4') - (R_1'' - R_4')$$

where $R'_i$ and $R''_i$ ($i=1$ to 4) are respective first and second pseudo-range measurements.

31. A method as claimed in claim 30, wherein said set of double difference accumulated carrier phase measurements are related to said double difference range measurements according to the following equations:

$$\nabla\phi_{12}=[(R_2''-R_2')-(R_1''-R_1')]/2-N_{12}$$

$$\nabla\phi_{13}=[(R_3''-R_3')-(R_1''-R_1')]/2-N_{13}$$

$$\nabla\phi_{14}=[(R_4''-R_4')-(R_1''-R_1')]/2-N_{14}$$

where $\nabla\phi_{12}$, $\nabla\phi_{13}$, $\nabla\phi_{14}$ are the double difference accumulated carrier phases for satellites 1 to 4, and $N_{12}$, $N_{13}$, $N_{14}$ are the initial integer phase ambiguities for satellites 1 to 4.

32. A method as claimed in claim 26, wherein the step of receiving signals from a plurality of satellites comprises the steps of receiving said signals from four satellites and processing said signals separately using a common clock to extract phase information indicative of ranges from the respective signals.

33. A method as claimed in claim 27, wherein said step of performing a comparison comprises the step of extracting a phase difference by comparing a satellite-generated code in the directly received signal with a satellite-generated code in the retransmitted signal.

34. A method as claimed in claim 27, wherein the step of retransmission comprises the step of shifting the retransmitted signals to an L-band carrier different from the direct signal carrier, or by shifting the retransmitted signals to other, unused GPS codes, to avoid overlap.

35. A method for calculating a position of a first unit relative to a second unit, comprising the steps of:
receiving at the second unit a first series of GPS signals from a predetermined number of satellites, said first series of GPS signals traversing signal paths extending directly between said satellites and said second point of interest;
receiving at the second unit a second series of GPS signals from the same satellites, said second series of GPS signals traversing signals paths which pass through a re-transmitting means located at the first point of interest;
computing a first set of range measurements based on the first series of GPS signals;
computing a second set of range measurements based on the second series of GPS signals;
computing a set of differential range measurements by subtracting respectively said first set of range measurements from said second set of range measurements;
computing a set of double difference range measurements by subtracting said differential range measurements from one another; and
deriving from said set of double difference range measurements a position of the first user station relative to said second user station.

36. A method as claimed in claim 35, wherein the step of computing double difference range equations comprises the step of computing $\delta\Delta R_{nx}$, $\delta\Delta R_{ny}$, and $\delta\Delta R_{nz}$ defined as follows:

$$\delta\Delta R_{12}=(R_2''-R_2')-(R_1''-R_1')$$

$$\delta\Delta R_{13}=(R_3''-R_3')-(R_1''-R_1')$$

$$\delta\Delta R_{14}=(R_4''-R_4')-(R_1''-R_1')$$

where $R'_i$ and $R''_i$ ($i=1$ to 4) are respective first and second pseudo-range measurements.

37. A method as claimed in claim 35, wherein said set of double difference accumulated carrier phase measurements are related to said double difference range measurements according to the following equations:

$$\nabla\phi_{12}=[(R_2''-R_2')-(R_1''-R_1')]/2-N_{12}$$

$$\nabla\phi_{13}=[(R_3''-R_3')-(R_1''-R_1')]/2-N_{13}$$

$$\nabla\phi_{14}=[(R_4''-R_4')-(R_1''-R_1')]/2-N_{14}$$

where $\nabla\phi_{12}$, $\nabla\phi_{13}$, $\nabla\phi_{14}$ are the double difference accumulated carrier phases for satellites 1 to 4, and $N_{12}$, $N_{13}$, $N_{14}$ are the initial integer phase ambiguities for satellites 1 to 4.

38. A method as claimed in claim 37, further comprising the steps of: computing a set of GPS carrier phase measurements representing cumulative measurements of the carrier phase to each of said satellites; and calculating a set of double difference accumulated carrier phase measurements based on said set of GPS carrier phase measurements, said set of double difference accumulated carrier phase measurements being related to said double difference range measurements according to the following equations:

$$\nabla\phi_{12}=[(R_2''-R_2')-(R_1''-R_1')]/2-N_{12}$$

$$\nabla\phi_{13}=[(R_3''-R_3')-(R_1''-R_1')]/2-N_{13}$$

$$\nabla\phi_{14}=[(R_4''-R_4')-(R_1''-R_1')]/2-N_{14}$$

where $\nabla\phi_{12}$, $\nabla\phi_{13}$, $\nabla\phi_{14}$ are the double difference accumulated carrier phases for satellites 1 to 4, and $N_{12}$, $N_{13}$, $N_{14}$ are the initial integer phase ambiguities for satellites 1 to 4, the position of the first user station relative to the second user station also being derived from the double difference accumulated carrier phase measurements.

39. A method as claimed in claim 35, wherein the step of receiving signals from a plurality of satellites comprises the steps of receiving said signals from four satellites and processing said signals separately using a common clock to extract phase information indicative of ranges from the respective signals.

40. A method as claimed in claim 35, wherein said step of performing a comparison comprises the step of extracting a phase difference by comparing a satellite-generated code in the directly received signal with a satellite-generated code in the retransmitted signal.

41. A method as claimed in claim 35, wherein the step of retransmission comprises the step of shifting the retransmitted signals to an L-band carrier different from the direct signal carrier, or by shifting the retransmitted signals to other, unused, GPS codes, to avoid overlap.

42. In a method of determining velocities of a first unit relative to a second unit of the type which includes the step of receiving signals from a plurality of satellites deployed at spaced intervals within one or more geostationary orbits, the improvement comprising the steps of retransmitting the signals in their entirety, without delay, from said satellites to the second unit; receiving at the second unit directly from said satellites and simultaneously receiving the signals retransmitted from the first unit; and performing a real time sample-by-sample comparison of the directly received and retransmitted signals in order to extract information, without input of additional velocity data, concerning the relative velocities of the first and second units.

43. A method as claimed in claim 25, further comprising the steps of computing a first set of velocity measurements based on said retransmitted signals, means for computing a second set of velocity measurements based on the GPS signals received from said satellites, and means for subtracting said respective velocity measurements in said first and second sets to obtain a difference measurement free of bias errors.

44. A method as claimed in claim 26, further comprising the steps of calculating a set of double difference velocity measurements based on said first and said second sets of velocity measurements, and deriving the velocity of said first unit relative to said second unit based on said double difference velocity measurements.

45. A method as claimed in claim 26, further comprising the steps of calculating a set of double difference velocity measurements based on said first and said second sets of velocity measurements, computing a set of GPS carrier phase measurements representing cumulative measurements of the carrier phase to each of said satellites, calculating a set of double difference accumulated carrier phase measurements based on said set of GPS carrier phase measurements, and deriving the velocity of said first unit relative to said second unit based on said double difference velocity measurements and said double difference accumulated carrier phase measurements.

* * * * *